United States Patent
Black et al.

(10) Patent No.: US 9,335,838 B2
(45) Date of Patent: May 10, 2016

(54) TAGGING OF WRITTEN NOTES CAPTURED BY A SMART PEN

(71) Applicant: Livescribe Inc., Oakland, CA (US)

(72) Inventors: David Robert Black, Sunnyvale, CA (US); Brett Reed Halle, Pleasanton, CA (US)

(73) Assignee: Livescribe Inc., Oakland, CA (US)

( * ) Notice: Subject to any disclaimer, the term of this patent is extended or adjusted under 35 U.S.C. 154(b) by 0 days.

(21) Appl. No.: 14/062,665

(22) Filed: Oct. 24, 2013

(65) Prior Publication Data

US 2015/0116272 A1    Apr. 30, 2015

(51) Int. Cl.
G06F 3/0354    (2013.01)

(52) U.S. Cl.
CPC .................................. G06F 3/03545 (2013.01)

(58) Field of Classification Search
CPC ............ G06F 3/03545; G06F 3/03542; G06F 3/0317; G06F 3/0386; G06F 3/033; A63F 13/04; A63F 2300/1018
See application file for complete search history.

(56) References Cited

U.S. PATENT DOCUMENTS

| | | | |
|---|---|---|---|
| 7,353,453 B1 | 4/2008 | Simmons | |
| 2002/0054026 A1* | 5/2002 | Stevenson | G06F 3/038 345/173 |
| 2006/0147117 A1 | 7/2006 | Wakeam et al. | |
| 2008/0296074 A1* | 12/2008 | Hollstron | G06F 3/03545 178/19.01 |
| 2010/0002937 A1 | 1/2010 | Silverbrook et al. | |
| 2010/0039296 A1 | 2/2010 | Marggraff et al. | |

OTHER PUBLICATIONS

PCT International Search Report and Written Opinion, PCT Application No. PCT/US2014/061420, Jan. 14, 2015, ten pages.

* cited by examiner

*Primary Examiner* — Premal Patel
(74) *Attorney, Agent, or Firm* — Fenwick & West LLP (57) ABSTRACT

A system and a method are disclosed for organizing content collected in a pen-based computing system. A plurality of groups of stroke data are obtained. Each group of stroke data is associated with a timestamp based on the timing of strokes made by the smart pen. The groups of stroke data are grouped into one or more snippets based on a temporal proximity of the timestamps and spatial proximity of the stroke data. A request to associate a snippet to a tag is received. An association between the snippet and the tag is stored responsive to the request.

16 Claims, 8 Drawing Sheets

TAGGING OF WRITTEN NOTES CAPTURED BY A SMART PEN

BACKGROUND

This invention relates generally to pen-based computing environments, and more particularly to organizing recorded writing with other contextual content in a smart pen environment.

A smart pen is an electronic device that digitally captures writing gestures of a user and converts the captured gestures to digital information that can be utilized in a variety of applications. For example, in an optics-based smart pen, the smart pen includes an optical sensor that detects and records coordinates of the pen while writing with respect to a digitally encoded surface (e.g., a dot pattern). The smart pen computing environment can also collect contextual content (such as recorded audio), which can be replayed in the digital domain in conjunction with viewing the captured writing. The smart pen can therefore provide an enriched note taking experience for users by providing both the convenience of operating in the paper domain and the functionality and flexibility associated with digital environments. However, it is challenging to structure and organize the vast amount of information collected in a smart pen environment to ensure a productive reviewing experience.

SUMMARY

Disclosed embodiments include a technique for organizing content collected in a pen-based computing system. In one embodiment, a plurality of groups of stroke data are obtained. Each group of stroke data is associated with a timestamp based on the timing of strokes made by the smart pen. The groups of stroke data are grouped into one or more snippets based on a temporal proximity of the timestamps and spatial proximity of the stroke data. A request to associate a snippet to a tag is received. For instance, a request to associate a tag to an "important" tag may be received. The association between the snippet and the tag is stored responsive to the request.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview of a Pen-Based Computing System

Figure 1:
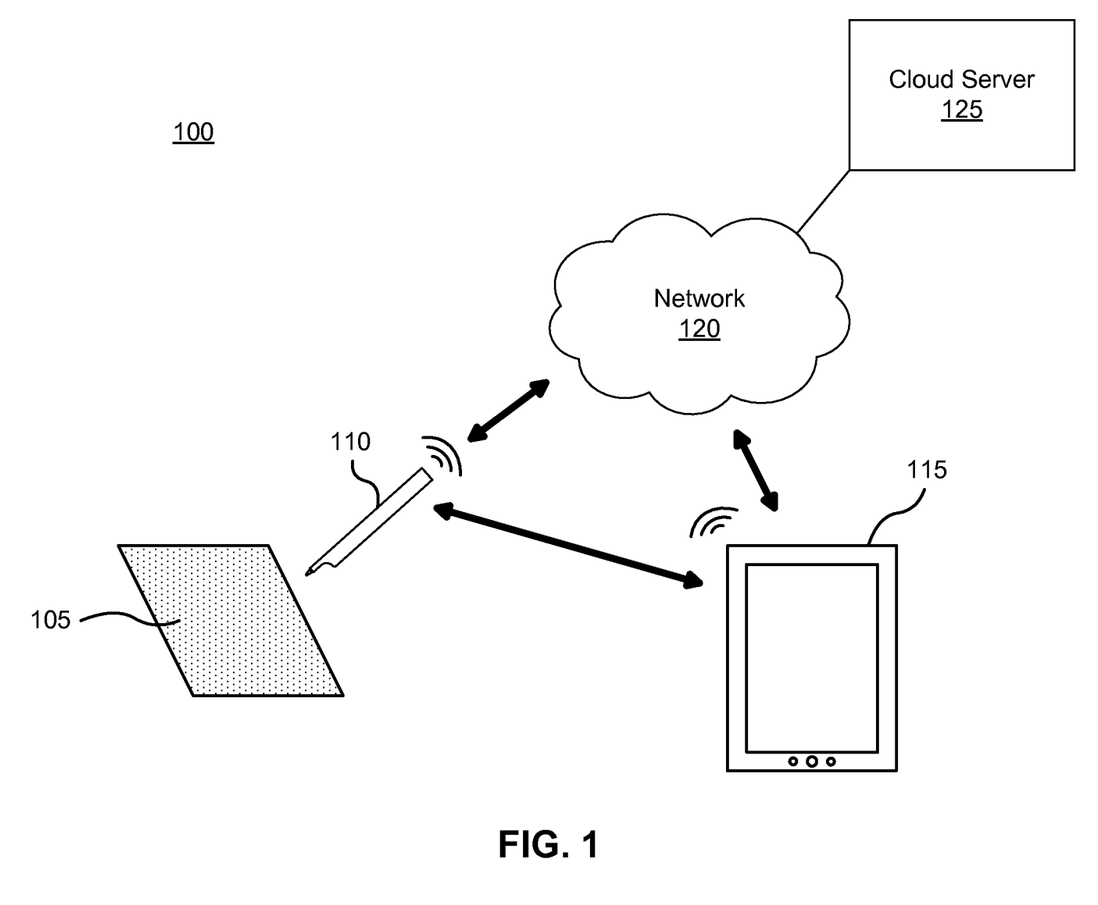
FIG. 1 is a diagram of an embodiment of a smart pen-based computing system.

FIG. 1 illustrates an embodiment of a pen-based computing system 100. The pen-based computing system comprises a writing surface 105, a smart pen 110, a computing device 115, a network 120, and a cloud server 125. In alternative embodiments, different or additional devices may be present such as, for example, additional smart pens 110, writing surfaces 105, and computing devices 115 (or one or more device may be absent).

In one embodiment, the writing surface 105 comprises a sheet of paper (or any other suitable material that can be written upon) and is encoded with a pattern (e.g., a dot pattern) that can be sensed by the smart pen 110. The pattern is sufficiently unique to enable the smart pen 110 to determine its relative positioning (e.g., relative or absolute) with respect to the writing surface 105. In another embodiment, the writing surface 105 comprises electronic paper, or e-paper, or may comprise a display screen of an electronic device (e.g., a tablet, a projector), which may be the computing device 115 or a different device. In other embodiments, the relative positioning of the smart pen 110 with respect to the writing surface 105 is determined without use of a dot pattern. For example, in an embodiment, where the writing surface 105 comprises an electronic surface, the sensing may be performed entirely by the writing surface 105 instead of by the smart pen 110, or in conjunction with the smart pen 110. Movement of the smart pen 110 may be sensed, for example, via optical sensing of the smart pen 110, via motion sensing of the smart pen 110, via touch sensing of the writing surface 105, via a fiducial marking, or other suitable means.

The smart pen 110 is an electronic device that digitally captures interactions with the writing surface 105 (e.g., writing gestures and/or control inputs). The smart pen 110 is communicatively coupled to the computing device 115 either directly or via the network 120. The captured writing gestures and/or control inputs may be transferred from the smart pen 110 to the computing device 115 (e.g., either in real time or at a later time) for use with one or more applications executing on the computing device 115. Furthermore, digital data and/or control inputs may be communicated from the computing device 115 to the smart pen 110 (either in real time or as an offline process) for use with an application executing on the smart pen 110. Commands may similarly be communicated from the smart pen 110 to the computing device 115 for use with an application executing on the computing device 115. The cloud server 125 provides remote storage and/or application services that can be utilized by the smart pen 110 and/or the computing device 115. The pen-based computing system 100 thus enables a wide variety of applications that combine user interactions in both paper and digital domains.

In one embodiment, the smart pen 110 comprises a writing instrument (e.g., an ink-based ball point pen, a stylus device without ink, a stylus device that leaves "digital ink" on a display, a felt marker, a pencil, or other writing apparatus) with embedded computing components and various input/output functionalities. A user may write with the smart pen 110 on the writing surface 105 as the user would with a conventional pen. During the operation, the smart pen 110 digitally captures the writing gestures made on the writing surface 105 and stores electronic representations of the writing gestures. The captured writing gestures have both spatial components and a time component. In one embodiment, the smart pen 110 captures position samples (i.e., coordinate information) of the smart pen 110 with respect to the writing surface 105 at various sample times and stores the captured position information together with the timing information of each sample. The captured writing gestures may furthermore include identifying information associated with the particular writing surface 105 such as, for example, identifying information of a particular page in a particular notebook so as to distinguish between data captured with different writing surfaces 105. In another embodiment, the smart pen 110 also captures other attributes of the writing gestures chosen by the user. For example, ink color may be selected by tapping a printed icon on the writing surface 105, selecting an icon on a computer display, etc. This ink information (color, line width, line style, etc.) may also be encoded in the captured data.

In an embodiment, the computing device 115 additionally captures contextual data while the smart pen 110 captures written gestures. In an alternative embodiment, written gestures may instead be captured by the computing device 115 or writing surface 105 (if different from the computing device 115) instead of, or in addition to, being captured by the smart pen 110. The contextual data may include audio and/or video from an audio/visual source (e.g., the surrounding room). Contextual data may also include, for example, user interactions with the computing device 115 (e.g. documents, web pages, emails, and other concurrently viewed content), information gathered by the computing device 115 (e.g., geospatial location), and synchronization information (e.g., cue points) associated with time-based content (e.g., audio or video) being viewed or recorded on the computing device 115. The computing device 115 stores the contextual data synchronized in time with the captured writing gestures (i.e., the relative timing information between the captured written gestures and contextual data is preserved). In an alternate embodiment, the smart pen 110 or a combination of a smart pen 110 and a computing device 115 captures contextual data. Furthermore, in an alternate embodiment, some or all of the contextual data can be stored on the smart pen 110 instead of, or in addition to, being stored on the computing device 115.

Synchronization between the smart pen 110 and the computing device 115 (or between multiple smart pens 110 and/or computing devices 115) may be assured in a variety of different ways when capturing contextual information. For example, a universal clock may be used for synchronization between different devices. In an alternate embodiment, local device-to-device synchronization is performed between two or more devices. In another embodiment, content captured by the smart 110 or computing device 115 can be combined with previously captured data and synchronized in post-processing. Synchronization of the captured writing gestures, audio data, and/or digital data may be performed by the smart pen 110, the computing device 115, a remote server (e.g., the cloud server 125) or by a combination of devices.

In one embodiment, the smart pen 110 is capable of outputting visual and/or audio information. The smart pen 110 may furthermore execute one or more software applications that control various outputs and operations of the smart pen 110 in response to different inputs.

In one embodiment, the smart pen 110 can furthermore detect text or other pre-existing content on the writing surface 105. The pre-existing content may include content previously created by the smart pen 110 itself or pre-printed content from other sources (e.g., a printed set of lecture slides). In one embodiment, the smart pen 110 directly recognizes the pre-existing content itself (e.g., by performing text recognition). In another embodiment, the smart pen recognizes positional information of the smart pen 110 and determines what pre-content is being interacted by correlating the captured positional information with known positional information of the pre-existing content. For example, the smart pen 110 can tap on a particular word or image on the writing surface 105, and the smart pen 110 could then take some action in response to recognizing the pre-existing content such as creating contextual data or transmitting a command to the computing device 115. Tapping pre-existing content symbols can create contextual markers associated with recently captured written gestures. Examples of contextual markers can include, for example, indications that the recently captured written gesture is an important item, a task, or should be associated with a particular pre-existing or user-defined tag. As another example, tapping pre-printed content symbolizing controls for a recording device could indicate to the computing device 115 that an associated active audio or video recorder should begin or stop recording. In another example, the smart pen 110 could translate a word on the page by either displaying the translation on a screen or playing an audio recording of it (e.g., translating a Chinese character to an English word).

The computing device 115 may comprise, for example, a tablet computing device, a mobile phone, a laptop or desktop computer, or other electronic device (e.g., another smart pen 110). The computing device 115 may execute one or more applications that can be used in conjunction with the smart pen 110. For example, written gestures and contextual data captured by the smart pen 110 may be transferred to the computing system 115 for storage, playback, editing, and/or further processing. Additionally, data and or control signals available on the computing device 115 may be transferred to the smart pen 110. Furthermore, applications executing concurrently on the smart pen 110 and the computing device 115 may enable a variety of different real-time interactions between the smart pen 110 and the computing device 115. For example, interactions between the smart pen 110 and the writing surface 105 may be used to provide input to an application executing on the computing device 115 (or vice versa). Additionally, the captured stroke data may be displayed in real-time in the computing device 115 as it is being captured by the smart pen 110.

In order to enable communication between the smart pen 110 and the computing device 115, the smart pen 110 and the computing device 115 may establish a "pairing" with each other. The pairing allows the devices to recognize each other and to authorize data transfer between the two devices. Once paired, data and/or control signals may be transmitted between the smart pen 110 and the computing device 115 through wired or wireless means. In one embodiment, both the smart pen 110 and the computing device 115 carry a TCP/IP network stack linked to their respective network adapters. The devices 110, 115 thus support communication using direct (TCP) and broadcast (UDP) sockets with applications executing on each of the smart pen 110 and the computing device 115 able to use these sockets to communicate.

The network 120 enables communication between the smart pen 110, the computing device 115, and the cloud server 125. The network 120 enables the smart pen 110 to, for example, transfer captured contextual data between the smart pen 110, the computing device 115, and/or the cloud server 125, communicate control signals between the smart pen 110, the computing device 115, and/or cloud server 125, and/or communicate various other data signals between the smart pen 110, the computing device 115, and/or cloud server 125 to enable various applications. The network 120 may include wireless communication protocols such as, for example, Bluetooth, WiFi, WiMax, cellular networks, infrared communication, acoustic communication, or custom protocols, and/or may include wired communication protocols such as USB or Ethernet. Alternatively, or in addition, the smart pen 110 and computing device 115 may communicate directly via a wired or wireless connection without requiring the network 120.

The cloud server 125 comprises a remote computing system coupled to the smart pen 110 and/or the computing device 115 via the network 120. For example, in one embodiment, the cloud server 125 provides remote storage for data captured by the smart pen 110 and/or the computing device 115. Furthermore, data stored on the cloud server 125 can be accessed and used by the smart pen 110 and/or the computing device 115 in the context of various applications.

Smart Pen System Overview

Figure 2:
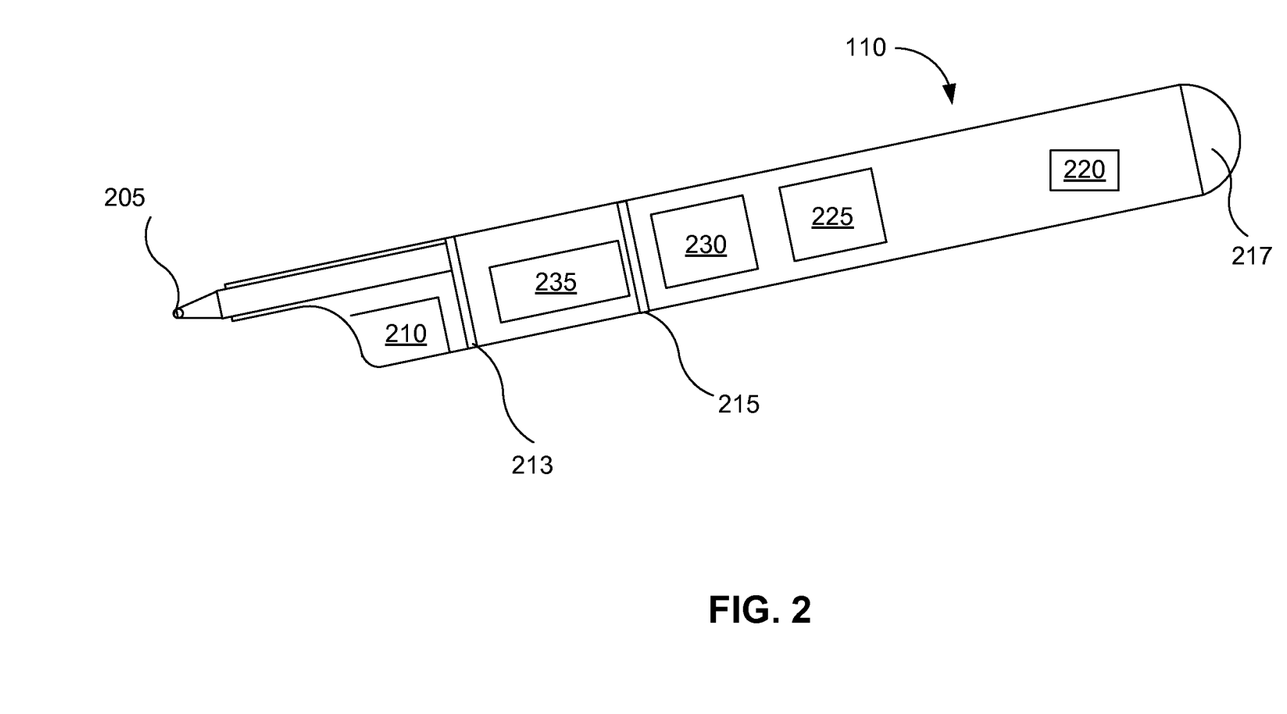
FIG. 2 is a diagram of an embodiment of a smart pen device for use in a pen-based computing system.

FIG. 2 illustrates an embodiment of the smart pen 110. In the illustrated embodiment, the smart pen 110 comprises a marker 205, an imaging system 210, a pen down sensor 213, a power state mechanism 215, a stylus tip 217, an I/O port 220, a processor 225, an onboard memory 230, and a battery 235. Other optional components of the smart pen 110 are omitted from FIG. 2 for clarity of description including, for example, status indicator lights, buttons, one or more microphones, a speaker, an audio jack, and a display. In alternative embodiments, the smart pen 110 may have fewer, additional, duplicate, or different components than those illustrated in FIG. 2.

The marker 205 comprises any suitable marking mechanism, including any ink-based or graphite-based marking devices or any other devices that can be used for writing. The marker 205 is coupled to a pen down sensor 213, such as a pressure sensitive element. In an alternate embodiment, the marker 205 may make electronic marks on a writing surface 105 using a paired projector or electronic display.

The imaging system 210 comprises optics and sensors for imaging an area of a surface near the marker 205. The imaging system 210 may be used to capture handwriting and gestures made with the smart pen 110. For example, the imaging system 210 may include an infrared light source that illuminates a writing surface 105 in the general vicinity of the marker 205, where the writing surface 105 includes an encoded pattern. By processing the image of the encoded pattern, the smart pen 110 can determine where the marker 205 is in relation to the writing surface 105. An imaging array of the imaging system 210 then images the surface near the marker 205 and captures a portion of a coded pattern in its field of view.

In other embodiments of the smart pen 110, an appropriate alternative mechanism for capturing writing gestures may be used. For example, in one embodiment, position on the page is determined by using pre-printed marks, such as words or portions of a photo or other image. By correlating the detected marks to a digital version of the document, position of the smart pen 110 can be determined. For example, in one embodiment, the smart pen's position with respect to a printed newspaper can be determined by comparing the images captured by the imaging system 210 of the smart pen 110 with a cloud-based digital version of the newspaper. In this embodiment, the encoded pattern on the writing surface 105 may not be needed because other content on the page can be used as reference points. Data captured by the imaging system 210 is subsequently processed using one or more content recognition algorithms such as character recognition.

In another embodiment, the imaging system 210 can be used to scan and capture written content that already exists on the writing surface 105. This imaging system can be used, for example, to recognize handwritten or printed text, images, or controls on the writing surface 105. In other alternative embodiments, the imaging system 210 may be omitted from the smart pen 110, for example, in embodiments where gestures are captured by a writing surface 105 integrated with an electronic device (e.g., a tablet) rather than by the smart pen 110.

The pen down sensor 213 determines when the smart pen is down. As used herein, the phrase "pen is down" indicates that the marker 205 is pressed against or engaged with a writing surface 105. In an embodiment, the pen down sensor 213 produces an output when the pen is down, thereby detecting when the smart pen 110 is being used to write on a surface or is being used to interact with controls or buttons (e.g., tapping) on the writing surface 105. Embodiments of the pen down sensor 213 may include capacitive sensors, piezoresistive sensors, mechanical diaphragms, and electromagnetic diaphragms. The imaging system 210 may further be used in combination with the pen down sensor 213 to determine when the marker 205 is touching the writing surface 105. For example, the imaging system 210 could be used to determine if the marker 205 is within a particular range of a writing surface 105 using image processing (e.g. based on a fast Fourier transform of a capture image). In an alternate embodiment, a separate range-finding optical, laser, or acoustic device could be used with the pen down sensor 213. In an alternative embodiment, the smart pen 110 can detect vibrations indicating when the pen is writing or interacting with controls on the writing surface 105. In an alternative embodiment, a pen up sensor may be used to determine when the smart pen 110 is up. As used herein, the phrase "pen is up," indicates that the marker 205 is neither pressed against nor engaged with a writing surface 105. In some embodiments, the pen down sensor 213 may additionally be coupled with the stylus tip 217, or there may be an additional pen down sensor coupled with or incorporated in the stylus tip 217.

The power status mechanism 215 can toggle the power status of the smart pen 110. The power status mechanism may also sense and output the power status of the smart pen 110. The power status mechanism may be embodied as a rotatable switch integrated with the pen body, a mechanical button, a dial, a touch screen input, a capacitive button, an optical sensor, a temperature sensor, or a vibration sensor. When the power status mechanism 215 is toggled on, the pen's battery 235 is activated, as are the imaging system 210, the input/output device 220, the processor 225, and onboard memory 230. In some embodiments, the power status mechanism 215 toggles status lights, displays, microphones, speakers, and other components of the smart pen 110. In some embodiments, the power status mechanism 215 may be mechanically, electrically, or magnetically coupled to the marker 205 such that the marker 205 extends when the power status mechanism 215 is toggled on and retracts when the power status mechanism 215 is toggled off. In some embodiments, the power status mechanism 215 is coupled to the marker 205 and/or the capacitive tip such that use of the marker and/or capacitive tip 217 toggles the power status. In some embodiments, the power status mechanism 215 may have multiple positions, each position toggling a particular subset of the components in the smart pen 110.

The stylus tip 217 is used to write on or otherwise interact with devices or objects without leaving a physical ink mark. Examples of devices for use with the stylus tip might include tablets, phones, personal digital assistants, interactive whiteboards, or other devices capable of touch-sensitive input. The stylus tip may make use of capacitance or pressure sensing. In some embodiments, the stylus tip may be used in place of or in combination with the marker 205.

The input/output (I/O) device 220 allows communication between the smart pen 110 and the network 120 and/or the computing device 115. The I/O device 220 may include a wired and/or a wireless communication interface such as, for example, a Bluetooth, Wi-Fi, WiMax, 3G, 4G, infrared, or ultrasonic interface, as well as any supporting antennas and electronics.

A processor 225, onboard memory 230 (i.e., a non-transitory computer-readable storage medium), and battery 235 (or any other suitable power source) enable computing functionalities to be performed on the smart pen 110. The processor 225 is coupled to the input and output devices (e.g., imaging system 210, pen down sensor 213, power status mechanism 215, stylus tip 217, and input/output device 220) as well as onboard memory 230 and battery 235, thereby enabling applications running on the smart pen 110 to use those components. As a result, executable applications can be stored to a non-transitory computer-readable storage medium of the onboard memory 230 and executed by the processor 225 to carry out the various functions attributed to the smart pen 110 that are described herein. The memory 230 may furthermore store the recorded written and contextual data, either indefinitely or until offloaded from the smart pen 110 to a computing system 115 or cloud server 125.

In an embodiment, the processor 225 and onboard memory 230 include one or more executable applications supporting and enabling a menu structure and navigation through a file system or application menu, allowing launch of an application or of a functionality of an application. For example, navigation between menu items comprises an interaction between the user and the smart pen 110 involving spoken and/or written commands and/or gestures by the user and audio and/or visual feedback from the smart pen computing system. In an embodiment, pen commands can be activated using a "launch line." For example, on dot paper, the user draws a horizontal line from right to left and then back over the first segment, at which time the pen prompts the user for a command. The user then prints (e.g., using block characters) above the line the desired command or menu to be accessed (e.g., Wi-Fi Settings, Playback Recording, etc.). Using integrated character recognition (ICR), the pen can convert the written gestures into text for command or data input. In alternative embodiments, a different type of gesture can be recognized to enable the launch line. Hence, the smart pen 110 may receive input to navigate the menu structure from a variety of modalities.

Collecting and Storing Written and Contextual Data

During a smart pen computing session, the pen-based computing system 100 acquires content that comes in two primary forms, that generated or collected through the operation of the smart pen 110, and that generated in or collected by a computing device 115. This data may include, for example, stroke data, audio data, digital content data, and other contextual data.

Stroke data represents, for example, a sequence of temporally indexed digital samples encoding coordinate information (e.g., "X" and "Y" coordinates) of the smart pen's position with respect to a particular writing surface 105 captured at various sample times. Generally, an individual stroke begins when the pen is down and ends when the pen is up. Additionally, in one embodiment, the stroke data can include other information such as, for example, pen angle, pen rotation, pen velocity, pen acceleration, or other positional, angular, or motion characteristics of the smart pen 110. The writing surface 105 may change over time (e.g., when the user changes pages of a notebook or switches notebooks) and therefore identifying information for the writing surface may also be captured in the stroke data.

Audio data includes, for example, a sequence of temporally indexed digital audio samples captured at various sample times. Generally, an individual audio clip begins when a "record" command is captured and ends when a "stop record" command is captured. In some embodiments, audio data may include multiple audio signals (e.g., stereo audio data).

The captured digital content represents states associated with one or more applications executing on the computing device 115 captured during a smart pen computing session. The state information could represent, for example, a digital document or web page being displayed by the computing device 115 at a given time, a particular portion of a digital document or web page being displayed by the computing device at a given time, inputs received by the computing device at a given time, etc. The state of the computing device 115 may change over time based on user interactions with the computing device 115 and/or in response to commands or inputs from the stroke data (e.g., gesture commands) or audio data (e.g., voice commands).

Other data captured by the smart pen system may include contextual markers which stores identifiers associated with content that has been marked in a particular way. For example, a user can tap a button to categorize content according to various content categories (e.g., tasks for follow up, important content, etc.). Photographs or video captured during a smart pen computing session may also be stored and temporally indexed. Geospatial information pertaining to a location where the smart pen computing session took place (e.g., captured using a global positioning system) can also be captured and stored. Furthermore, pairing data or commands executed within the smart pen computing system 100 can be captured and stored.

In one embodiment, a smart computing session starts when a "record" command is captured and ends when a "stop record" command is captured. Alternatively, the smart pen computing session may start automatically when a smart pen computing application is initiated on the computing device 115, or may start and end automatically when the smart pen 110 is turned on and off.

Figure 3:
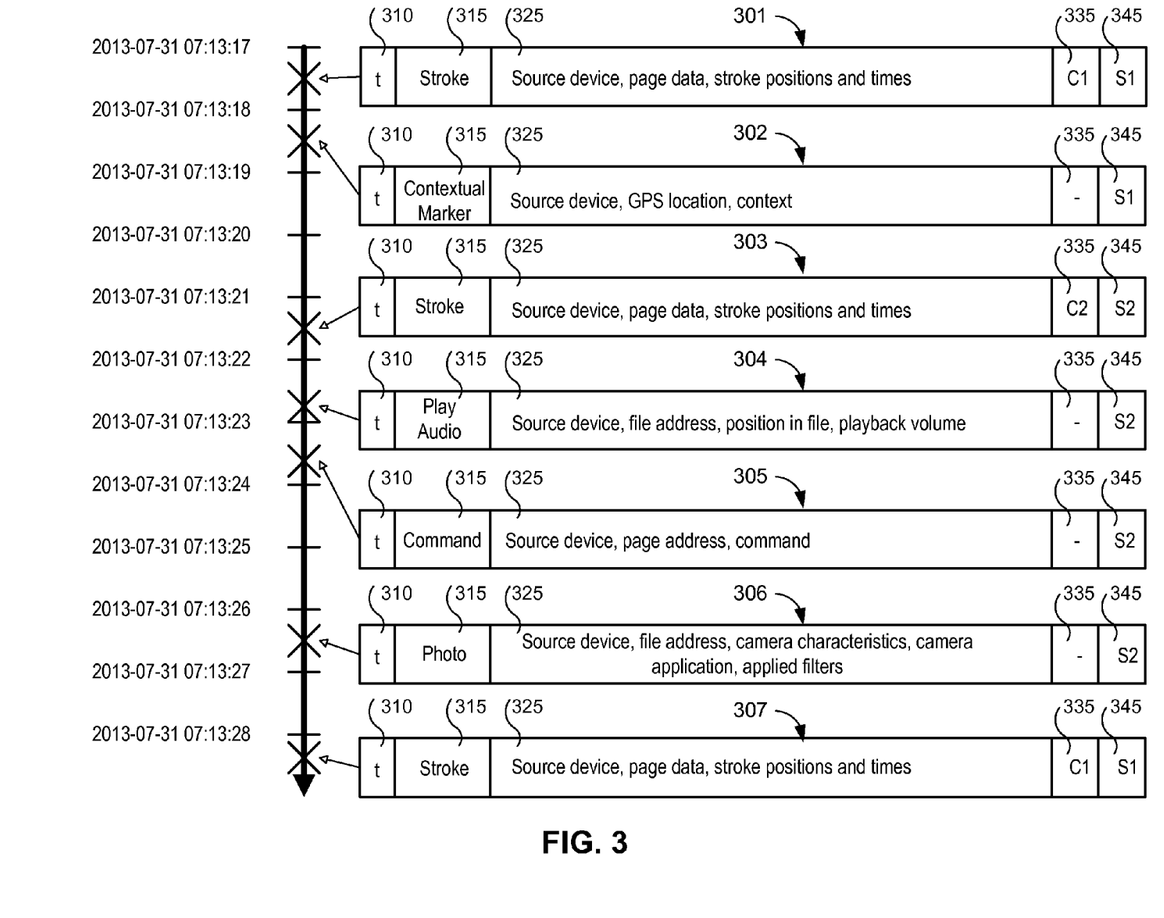
FIG. 3 is a timeline diagram demonstrating example events stored over time in an embodiment of a smart pen computing system.

FIG. 3 illustrates an example of content captured and organized in a pen-based computing system 100. In FIG. 3, each piece of content captured during a smart pen computing session is represented as an event, comprising one or more of the following fields: a timestamp 310, event content 315, metadata 325, an associated cluster 335, and an associated snippet 345. Storing individual actions as indexed events in a data store enables correlation of content between a smart pen 110 and a computing device 115. In an alternate embodiment, different categories of events may have different, additional, or fewer fields corresponding to information relevant to a category of events.

The event timestamp field 310 indicates when in time a particular event occurred. Event timestamps may be with respect to a universal time such as UTC (Coordinated Universal Time), Unix time, other time systems, or any offset thereof, or may be a relative time specified relative to other events or some reference time (e.g., relative to a power on time of the smart pen 110 or computing device 115). Timestamps may be implemented to arbitrary precision. In various possible implementations, timestamps may be stored to indicate the start time of the event, the end time of the event, or both.

The event content field 315 indicates data (or a reference to data) captured by the pen-based computing system 100 such as, for example, written content, recorded audio or video, photographs, geospatial information, pairing data between a smart pen 110 and a computing device 115, digital data clips referencing content concurrently displayed on a computing device 115 during a smart pen computing session, commands to the smart pen 110 and computing device 115, contextual markers, retrieved text and media, web pages, other information accessed from a cloud server 125, and other contextual data.

For example, each stroke captured by the smart pen 110 is generally stored as a separate event and referenced by the event content field 315. Similarly, audio capture events are stored as separate events with the audio clip referenced by the event capture field 315. Changes to the state of an application executing on the computing device during a smart pen computing session may also be captured as an event and referenced by the event capture field 315 to indicate, for example, that the user viewed a particular digital document or browsed a particular web site at a given time during the smart pen computing session. Contextual markers may be stored in the event capture field 315 to indicate that the user applied a particular tag to content. For an event associated with a photograph, the event content field 315 may contain the photographic data or a reference to the file location where the photograph is stored. For an event associated with an audio and/or video file, the event content field 315 may contain the audio and/or video file or a reference to the file location where the audio and/or video is stored.

The metadata field 325 includes additional data associated with the event. Data stored in the metadata field 325 can include, for example, information identifying the source device associated with the event content field 315 as well as relevant state data about that device. For written content consisting of strokes, the metadata field 325 includes, for example, page address information (e.g., surface type, page number, notebook ID, digital file reference, and so forth) associated with the writing surface 105. Metadata associated with a photograph includes, for example, source camera data, the camera application, and applied photo processing. Similarly, the metadata field 325 for recorded audio and video includes, for example, microphone and/or camera data, the recording application, commands input to the recording application, and applied audio and/or video processing. Geospatial information (e.g., Global Positioning System coordinates) can also be included in the metadata field 325 to provide additional contextual data pertaining to the location where the smart pen 110 or computing device 115 was used to capture the event. Metadata associated with events related to concurrently displayed content (such as text, email, documents, images, audio, video, web pages, applications, or a combination thereof) includes, for example, content source and user commands while viewing the concurrently displayed content. Metadata associated with commands and contextual markers includes, for example, information about the writing surface 105 such as surface type, page number, notebook ID, and digital file reference.

Events may contain references to organizational markers referred to herein as "clusters" and "snippets." A cluster comprises a set of one or more strokes grouped together based on contextual data such as the relative timing of the strokes, the relative physical positioning of the strokes, the result of handwriting recognition applied to the strokes, etc. Generally, each stroke is associated with one and only one cluster. In one embodiment, strokes are grouped into clusters according to a process that is generally intended to generate a one-to-one correspondence between a cluster and a single written word. In practice, the grouping may not always necessarily be one-to-one, and the system can still achieve the functionality described herein without perfect grouping of strokes to words. A process for grouping strokes into clusters is described in further detail below with reference to FIG. 5. The cluster field 335 in FIG. 3 stores a cluster identifier (e.g., C1, C2, etc.) identifying which cluster each stroke is associated with after the clustering process. Non-stroke events are not necessarily associated with a cluster.

A snippet comprises a set of one or more events and may include both strokes and other types of events such as contextual markers, audio, pictures, video, commands, etc. Generally, strokes that are grouped into a single cluster are grouped in the same snippet, but the snippet may also include other clusters. Events are generally grouped together into snippets based on contextual data such as the relative timing of the events, the relative physical positioning of the strokes, the result of handwriting recognition applied to the strokes, etc. In one embodiment, events are grouped into snippets (according to a process referred to herein as "snippetting") such that each snippet generally corresponds to a complete thought such as a sentence, list item, numbered item, or sketched drawing captured by the smart pen 110 while engaged with a writing surface 105. Generally, events correlated into a snippet have strong temporal correlation, but a later event can be correlated into an earlier snippet if there are strong non-temporal correlations such as, for example, when there is a strong correlation based on spatial location. Furthermore, the automated process for grouping events into snippets need not necessarily be perfect to achieve the functionality described herein. A process for grouping events into snippets is described in further detail below with reference to FIG. 6. The snippet field 345 in FIG. 3 stores a snippet identifier (e.g., S1, S2, etc.) identifying which snippet each event is associated with after the "snippetting" process. Some events are not necessarily associated with any snippet.

In one embodiment, written data associated with clusters and/or snippets may be automatically processed and converted to text using handwriting recognition or optical character recognition. The recognized text may be stored in place of, or in addition to, the stroke data itself in a cluster or snippet.

Although FIG. 3 illustrates some of the events as being assigned to a cluster and/or snippet for completeness of description, it should be understood that the cluster field 335 and snippet field 345 are not necessarily populated immediately upon capturing an event. Rather these fields may be populated at a later time. For example, the clustering and snippetting processes may execute periodically to group events into clusters and/or snippets. Alternatively, events may be grouped once completion of a particular cluster or snippet is detected.

A particular use case resulting in the example events shown in FIG. 3 is now described for illustrative purposes. Shortly after 07:13:17, a user writes a project name on a writing surface 105 with a smart pen 110 in a single stroke. This stroke is recorded as the first event 301. The system detects that the stroke corresponds to a single word and associates the stroke with a cluster C1 and snippet S1. The user then taps a printed symbol on the writing surface 105 with the smart pen 110 to indicate the project is a task item. This action is recorded as event 302, a contextual marker. Because the context is temporally correlated with the stroke in event 301, event 302 is correlated with snippet S1. Next, the user begins writing a project description on a new line, creating event 303. The stroke in event 303 is associated with a new cluster C2 and new snippet S2 because it is not sufficiently correlated with cluster C1 or snippet S1. The user then begins playing audio on a computing device 115. Event 304 is created, and indicates when the audio file began playing, which audio file was played, and where in the audio file playback began. Event 304 is associated with snippet S2 because of the temporal proximity to event 303. The user soon after taps, with the smart pen 110, a symbol on the writing surface 105 to indicate the playback volume on the computing device 115 should be increased. This creates command event 305, which is correlated with snippet S2 because of the temporal proximity to events 303 and 304. While listening to the audio, the user snaps a photograph with the computing device 115, which is recorded as event 306. The photo in event 306 is associated with snippet S2 because of the temporal proximity to event 305. Finally, the user notices a mistake in the project name and makes a correction with the smart pen 110, creating event 307. Event 307 is associated with cluster C1 and snippet S1 because of the spatial proximity to C1 in spite of the relative lack of temporal proximity to snippet S1. With the creation of each event, associated metadata 325 is stored with the corresponding event as described previously. Particular embodiments of the invention may assign cluster fields 335 or snippet fields 345 differently; this example is provided to illustrate the concepts of clusters and snippets.

Architecture for Organizing Written and Contextual Data

Figure 4:
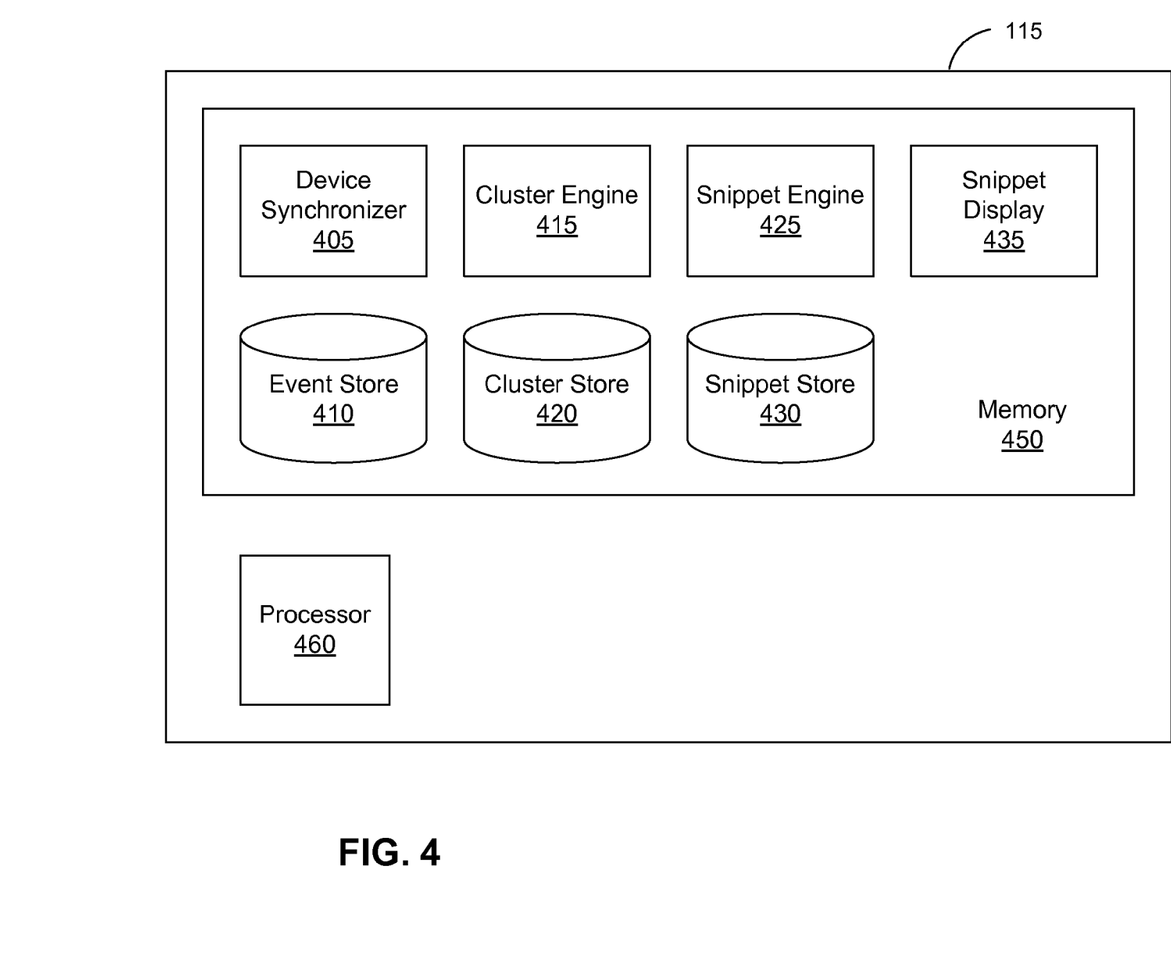
FIG. 4 is a block diagram of a system for organizing written and contextual data in an embodiment of a smart pen computing system.

FIG. 4 is a block diagram a system for organizing event data in a smart pen computing system 100. In one embodiment, the illustrated architecture can be implemented on a computing device 115, but in other embodiments, the architecture can be implemented on the smart pen 110, a computing device 115, a cloud server 125, or as a combination thereof. The computing device 115 shown in FIG. 4 includes a device synchronizer module 405, an event store 410, a cluster engine 415, a cluster store 420, a snippet engine, 425, a snippet store 430, and a snippet display module 435, all stored in a memory 450 (e.g., a non-transitory computer-readable storage medium). In operation, the various engines/modules (e.g., 405, 415, 425, and 435) are implemented as computer-executable program instructions executable by a processor 460. In other embodiments, the various components of FIG. 4 may be implemented in hardware, such as on an ASIC (application-specific integrated circuit).

The device synchronizer 405 synchronizes data received from various components of the pen-based computing system 100. For example, written data, commands, and contextual markers from the smart pen 110 are synchronized with recorded audio, recorded video, photographs, concurrently viewed web pages, digital documents, or other content, and commands to the computing device 115. Additional contextual data may be accessed from the cloud server 125. The device synchronizer 405 may process data continuously as it is collected or in discrete batches. When the smart pen 110 and computing device 115 are not paired while data is collected, the device synchronizer 405 engine can merge relevant contextual data with written data from the smart pen 110 when the devices are again paired. The device synchronizer 405 processes received data into events, which are stored in the event store 410. In one embodiment, the timestamp 310 is used to organize events in the event store 410 so that events can later be played back in the same order that they are captured.

The event store 410 stores events gathered by the device synchronizer 405. In one embodiment, events comprise various fields such as timestamp 310, event content 315, event metadata 325, an associated cluster 335, and an associated snippet 345, as described above. In one embodiment, the event store 410 indexes events by timestamp. Alternate embodiments may index data by cluster or snippet as a substitute or supplement to indexing by timestamp. The event store 410 is a source of input data for the cluster engine 415 and snippet engine 425.

The cluster engine 415 takes events containing stroke data from the event store 410 and correlates them into clusters. The correlated clusters correspond to aggregated strokes having a particular temporal and/or spatial relationship. For example, a cluster algorithm may cluster strokes such that each cluster generally corresponds to a discrete word written by a user of the smart pen 110, although this is not necessarily the case. In some cases, temporal proximity of strokes is not necessarily required to cluster the strokes. For example, strokes may be clustered based on strong spatial correlation alone. The cluster engine 415 may also apply integrated character recognition (ICR), optical character recognition (OCR), or handwriting recognition to captured strokes and results of these processes may be used in clustering. For example, strokes may be clustered when the cluster engine 415 recognizes a complete word that includes those strokes. The resulting clustered data may be output as indexed strokes, an image representing the aggregated strokes, a digital character conversion of the strokes, or a combination thereof. The output from the cluster engine 415 is stored in the cluster store 420.

The cluster store 420 receives output clusters from the cluster engine 415. In one embodiment, the clusters may be indexed by associated timestamp 310. In other embodiments, clusters may be indexed by associated snippet as a substitute or supplement to indexing by timestamp field 310. The information contained in the cluster store 420 is a source of input data for the snippet engine 425.

The snippet engine 430 takes events from the event store 410 and clusters from the cluster store 420 as inputs. The clusters from the cluster store are correlated according to positional and/or temporal information associated with each cluster. For example, if a user writes horizontally across a writing surface 105, the snippet engine may group clusters arranged across the horizontal row into a single snippet. If a user writes vertically, the snippet engine 430 may group the clusters arranged across the vertical column into a single snippet. If a user sketches a drawing, the snippet engine may group all the strokes of that drawing into a snippet. The snippet engine 425 may group events other than clusters of strokes into snippets. For example, events associated with relevant contextual data may be grouped into a snippet together with related stroke events or clusters to organize the events in a way that captures the thought process of the user while taking notes. For example, if a photograph was taken or a recording started in the middle of or after a snippet, that photograph or recording would be linked to that snippet. In some embodiments, if an audio or video file is being recorded or played during a snippet, that audio or video file is linked to the snippet along with a time position in the file corresponding to the time of the snippet. The times associated with a snippet include the first timestamp field 310, the last contained timestamp field 310, the average of the first and last contained timestamp fields 310, or the average of all contained timestamp fields 310. The output of the snippet engine 425 can includes references to all contained events, strokes, and clusters. In some embodiments, the output of the snippet engine 425 may include a character representation of all contained clusters or an image of all clusters and other content (photographs, preview frames of videos or web pages) in a snippet.

The snippet display 435 comprises instructions for displaying snippet information to a user. In one embodiment, all events associated with a snippet are displayed together. In one embodiment, successive snippets are displayed in a temporal order. In one embodiment, the snippet display 435 merges snippets collected by, and stored on, multiple devices in the pen-based computing system 100. In alternative embodiments, snippets may be displayed in an order based on the position (on the writing surface 105) of the strokes in the snippet, based on the geospatial location where the snippets were collected, or based on the smart pen 110 that collected the snippet.

The architecture described herein need not be implemented entirely on the same device. In some embodiments, data may be manipulated or stored across multiple devices in the pen-based computing system 100. Some elements to manipulate or store data may be implemented or duplicated on multiple devices. In an alternate embodiment, the smart pen performs the device synchronization 405, contains the event store 410 and cluster store 420, and also implements the cluster engine 415. Event and cluster information is transmitted over the network 120 to a computing device 115, which implements the snippet engine 425 and contains the snippet store 430. In an alternate embodiment, all information from event stores 410 on the smart pen 110 and computing device 115 are duplicated in a separate event store 410 on a cloud server 125. One skilled in the art can envisage multiple variations on the architecture in FIG. 4.

Organizing Stroke Data into Clusters and Snippets

Figure 5:
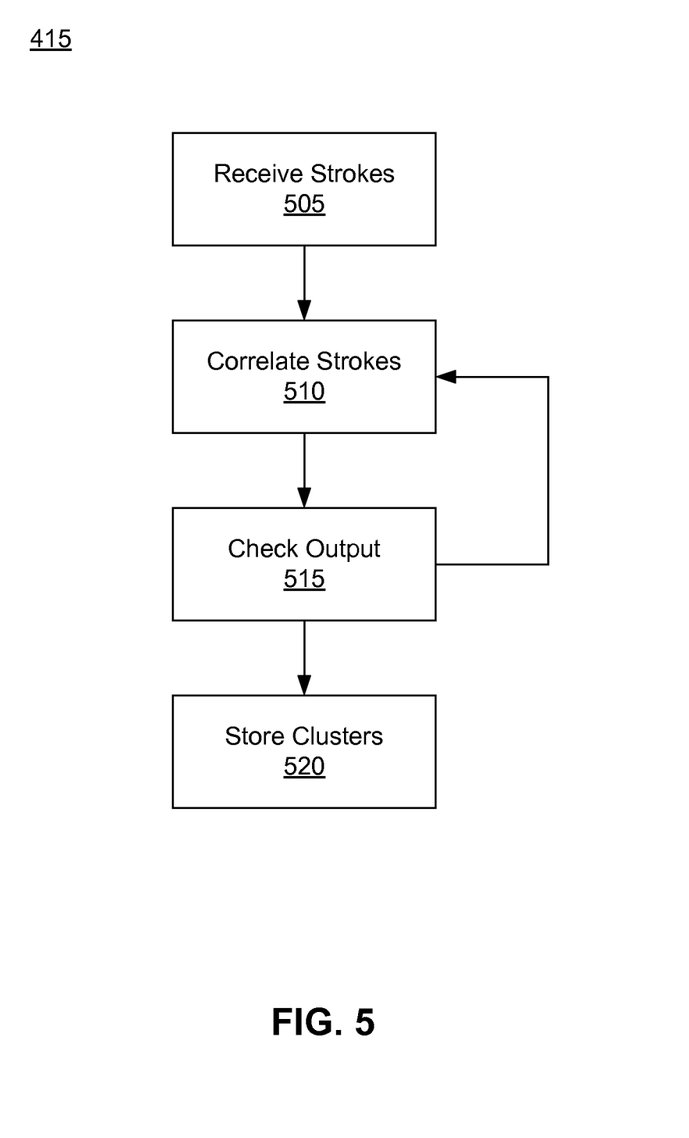
FIG. 5 is a flow diagram of a method for organizing written stroke data into clusters in an embodiment of a smart pen computing system.

FIG. 5 is a flow diagram illustrating an example process for converting stroke data into clusters as performed by the cluster engine 415. The cluster engine 415 receives 405 strokes from the event store 410. The cluster engine 415 correlates 510 the strokes by grouping the strokes based on temporal information, spatial information, and/or contextual data as described previously. The cluster engine 415 checks 515 each cluster. For example, the cluster engine 415 may use handwriting recognition to check if strokes in a cluster amount to intelligible characters. In some embodiments, the output checking step may check if individual characters form a word in a database. If the grouping of strokes is unsatisfactory, the unsatisfactory group or groups of strokes may be returned to the stroke correlation step 510 for an alternate grouping. In some embodiments, the number of times a group of strokes passes between stroke correlation 510 and output checking 515 may be limited. If the limit is reached, the original grouping of strokes may be maintained, or the grouping that resulted in the most recognized characters may be chosen. The output checking step 515 may not discern any characters in some cases, such as strokes corresponding to a sketched picture. After a group of strokes has been checked 515, the group of strokes is stored 520 as a cluster in the cluster store 420.

Figure 6:
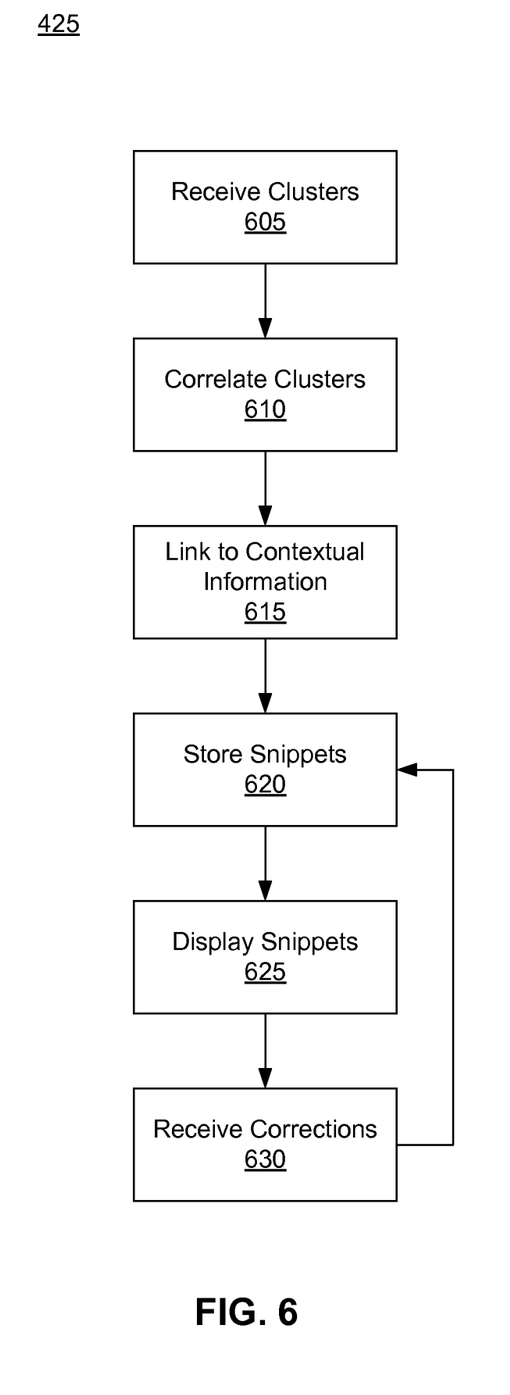
FIG. 6 is a flow diagram of a method for organizing clusters and contextual data into snippets in an embodiment of a smart pen computing system.

FIG. 6 is a flow diagram illustrating an example process for converting clusters or other events into snippets as performed by the snippet engine 425. The snippet engine 425 receives 605 clusters from the cluster store 420. The snippet engine 425 correlates 610 clusters into snippets based on temporal proximity, spatial proximity, and/or other contextual data. In one embodiment, the clusters, which represent words for example, are correlated into a snippet representing a complete thought such as written sentence, list item, numbered item, or a sketched drawing. In some embodiments, a natural language processing algorithm involving statistical inference or parsing may be used to assess likelihood of word association into a snippet. In an alternate embodiments, recognition of key characters such as bullets, numbers, or periods may be used to determine snippet boundaries.

After clusters are correlated 610, snippets are linked 615 to contextual data such as contextual markers, commands, photographs, location information, audio/video recordings, and concurrently viewed web pages, email, and documents. For example, in one embodiment, non-stroke events are retrieved from the event store 410 and linked to snippets according to temporal proximity, spatial proximity, and/or user interactions. For example, a user may indicate that an image is associated with text and therefore should be included as part of the same snippet. In some embodiments, metadata about contextual content such as title, description, or associated tags may be correlated with words in a snippet to associate the contextual content with a snippet. Next, the associated clusters and events in a snippet are stored 620 in the snippet store 430. The snippet engine 425 may then display 625 snippets on a display of a computing device (e.g., computing device 115). If a user disagrees with any of the automated snippet groupings, the user can manually break apart snippets or merge snippets. The snippet engine then receives 630 corrections from the user. These corrected snippets are stored 620 in the snippet store 430.

In cases where a user writes on the writing surface 105 from the beginning of the page to the end of the page, positional and temporal data correlate and thus clustering based on just one of either temporal or spatial proximity may be sufficient. However, when a user skips around the writing surface 105 to make corrections and amplifications to previously written text, positional and temporal data may not correlate. In an embodiment, a stroke received at a later time than proximate strokes may be clustered with proximate strokes if the later stroke spatially intersects or is within a predefined distance of at least one of the proximate strokes. In an embodiment, the later stroke may be grouped in the same snippet as earlier strokes as long as the earlier and later strokes are clustered together. When a later stroke does not spatially intersect earlier proximate strokes, the later stroke may be correlated into a separate cluster from the earlier strokes. Strokes that are correlated into separate clusters from other nearby strokes may be grouped into a separate snippet than the nearby strokes based on lack of temporal correlation. A user may write on a page of the writing surface 105 in two or more distinct recording sessions. In an embodiment, any strokes on the same page of the writing surface 105 are considered for clustering and snippetting regardless of recording session. In an alternate embodiment, the user may specify that writing on the same page be processed for clusters and snippets separately based on position or recording session.

Replay of Captured Content

Events captured during a smart pen computing session can be replayed in synchronization. For example, captured stroke data may be replayed, for example, as a "movie" of the captured strokes on a display of the computing device 115. Concurrently captured audio or other captured events may be replayed in synchronization based on the relative timestamps between the data. For example, captured audio can be replayed in synchronization with the stroke data to show what the user was hearing when writing different strokes. Furthermore, captured digital content may be replayed as a "movie" to show transitions between states of the computing device 115 that occurred while the user was writing. For example, the computing device 115 can show what web page, document, or portion of a document the user was looking at when writing different strokes.

In another embodiment, the user can then interact with the recorded data in a variety of different ways. For example, in one embodiment, the user can interact with (e.g., tap) a particular location on the writing surface 105 corresponding to previously captured strokes. The time stamp associated with that stroke event can then be determined and a replay session can begin from that time location.

By grouping captured events into snippets of related content, the user is given even more flexibility in reviewing the data captured during a smart pen computing sessions. For example, in one embodiment, each snippet may be displayed according to its recognized text and organized into lines called paper strips on a display screen. The user can sort paper strips containing snippets based on snippet timestamp so that the snippets appear sequentially even if the corresponding stroke data is organized completely differently on the page. Alternatively, the paper strips containing snippets can be organized based on tags or other user-defined search criteria. If a command or contextual marker is associated with a snippet, then an icon corresponding to that command or contextual marker may be displayed in the same paper strip as the text in that snippet. Selecting an icon corresponding to a command or contextual marker may prompt the user for additional information. For example, selecting an icon associated with a task contextual marker may prompt the user to create a task item from the associated snippet for use within the reviewing application and/or an external application. As another example, selecting an icon associated with a tag contextual marker may prompt the user to input text describing and/or categorizing the associated snippet.

If a photograph is associated with a snippet of written data, a small thumbnail version of the photograph may be displayed on the same horizontal line as the rest of the snippet. If a photograph is associated with no other snippet, a version of the photograph larger than a thumbnail may be displayed in a separate paper strip. If a geospatial location or calendar event is associated with a snippet, an icon corresponding to a location or calendar event may be displayed in the same paper strip as the associated snippet, and selection of this icon may link the user to a display of the location on a map or the corresponding calendar entry.

If an audio and/or video recording is associated with a snippet, then selecting a snippet may replay an excerpt of the audio and/or video that is temporally correlated with the written data in that snippet. In one embodiment, continuous playback may be enabled so that selection of a snippet may initiate playback that begins at a time corresponding to the beginning of a snippet. The continuous playback may continue until the end of the recording. In an embodiment, a visual signal may indicate which snippet is temporally correlated with the current position of the audio/video playback. If a webpage, email, or document is associated with a snippet, selecting the snippet may access the associated webpage, email, or document.

In an embodiment, the user can replay notes based on viewing other digital content. For example, suppose a user watches a digital movie on the computing device 115 while taking notes on the writing surface 105. Later, the user can replay the digital movie and see the user's notes replayed while watching a movie. The user can view a replay of notes as they appeared on the writing surface 105, or the user can view a replay of notes in the paper strip layout with visual indications of which paper strip corresponds to the current position of audio/visual playback. As another example, suppose a user viewed a webpage, an email, or a document on the computing device 115 while taking notes on the writing surface 105. The user may later review the webpage, email, or document while concurrently viewing taken notes. Snippets and paper strips having timestamps from the period the user reviewed the webpage, email, or document may be highlighted or contain some other visual indication of temporal correlation.

Content Tagging

Figure 7:
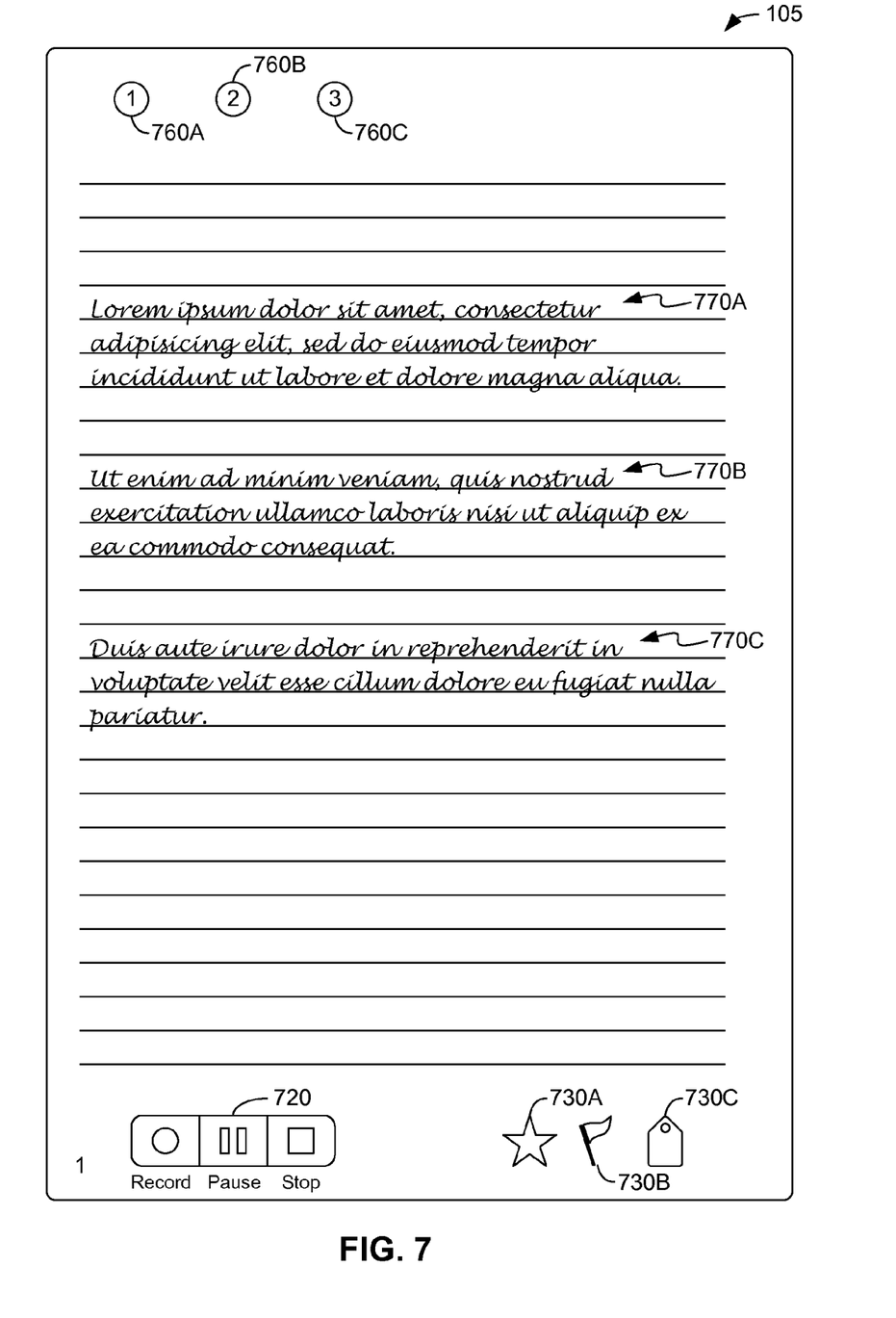
FIG. 7 is an embodiment of a writing surface used in conjunction with a smart pen.

FIG. 7 illustrates an exemplary writing surface 105 in one embodiment. Writing surface 105 includes recording controls 720, tagging controls 730, and custom controls 760, and snippets 770. Recording controls 720 may be used to start or stop an action. The actions associated with recording controls 720 may be started or stopped responsive to a gesture being made on top of the recording controls 720 with the smart pen 110. For example, in FIG. 7, recording controls 720 include a record button, a pause button and a stop button. The record button may be used to start capturing written gestures, audio data, or other digital data from the smart pen 110 or computing device 115. The pause button may be used to pause the capturing of written gesture, audio, or other digital data and the stop button may be used to stop the capturing of written gestures, audio, or other digital data.

Custom controls 760 (or "shortcut" buttons) may be used to perform user defined actions. For instance, a user may use an interface of the computing device 115 to associate actions to custom controls 760. For example, custom controls 760 may be used to create a reminder or a "to do" item based on recorded handwriting gesture written before or after the user interacts with (e.g., taps or gestures on) a control 760. Custom controls may additionally be used for sending recorded gestures via email or activating an application in a computing device 115 connected to the smart pen 110. In some embodiments, the actions are performed in real-time, as the gestures are being recorded by the smart pen 110. In other embodiments, the actions are performed when the smart pen 110 is connected to the computing device 115.

In some embodiments, custom controls 760 may be used in conjunction with other controls. For example, custom controls may be used in conjunction with recording controls 720. A user may write a gesture in the record button of recording controls 720 and then interact with (e.g., tap) one of the custom controls 760 to identify what to start recording. For instance, a user may select custom control 760A to start recording handwriting gestures, custom control 760B to start recording audio, and custom control 760C to start recording video.

Tagging controls 730 are used to assign contextual markers to one or more gestures captured by the smart pen 110. In some embodiments, contextual markers are assigned to one or more snippets. The exemplary writing surface of FIG. 7 includes three different tagging controls 730: an important tag 730A, a follow-up tag 730B, and a custom tag 730C. Embodiments of the writing surface 105 may contain additional or fewer tagging controls 730.

Important tag 730A may be used to mark a particular snippet as being particularly important. The important tag 730A may also be used in conjunction with custom controls 760 to assign different importance levels to different snippets. For example, important tag 730A can be used in conjunction with custom control 760A to assign a high importance to a snippet, in conjunction with custom control 760B to assign a medium importance to a snippet, and in conjunction with custom control 760C to assign a low importance to a snippet.

The follow-up tag 730B may be used to tag snippets that the user wants to designate for follow up actions. For example, the user may write a snippet "email project manager" and tag the snippet with the follow-up tag 730B. The user may then retrieve the snippets that were tagged with a follow-up tag to get a list of all the items that need a follow-up action. The follow-up tag may also be used in conjunction with custom controls 760. For example, custom controls 760 may be used to assign an importance to the follow-up action, to group follow-up actions by type, or to group follow-up actions by due date.

In some embodiments, the computing device 115 or the smart pen 110 may automatically extract information from snippets tagged with a follow-up tag 730B. For example, details of the follow-up action such as due date, date created, and other information may be extracted from the snippet. For instance, a user of the smart pen 110 may write the snippet "send final draft of report to Ayyappa by Friday" and associate the snippet with the follow-up tag 730B. The pen-based computing system may identify that the action is "send final draft," the recipient is "Ayyappa," and the due date is "Friday." The computing device 115 may additionally create a reminder or add the task to a calendar application based on the extracted information.

In some embodiments, the computing device 115 may automatically identify that a snippet should be tagged for a follow-up action by the contents of the snippet, without the user necessarily manually tagging the snippet. For instance, if a user writes the snippet "call Christine at 5 pm," the computing device 115 may determine that the snippet should be tagged as a follow-up action and may associate the snippet with the follow-up tag even if the user did not manually associate the snippet with the follow-up tag. In some embodiments, the computing device 115 may display a message to indicate the user that a candidate snippet has been identified. Additionally, the computing device may generate a reminder for the action.

The custom tag 730C may be used to tag a snippet with a user defined tag. The custom tag 730C may be used in conjunction with custom controls 760 to select between different selectable tags. In some embodiments, the user defined tags are defined using the computing device 115.

In one example, a user writes a snippet with the smart pen on the writing surface 105 and selects a tagging control 730. In this embodiment, the tag is associated with the last written snippet. For instance, a user may write snippet 770A on the writing surface 105 and select important tag 730A. Snippet 770A is then associated with important tag 730A. In some embodiments, the tagging control 730 is selected first and then the snippet 770 is written on the writing surface 105. In other embodiment, a user may select a snippet by writing a gesture near the snippet (e.g., circling the snippet, tapping the snippet, drawing a star near the snippet, etc.) and then select a tagging control to associate the selected snippet 770 with the selected tag.

In other embodiments, the computing device 115 may be used to assign tags to snippets without using the controls on the writing surface 105. For example, a button on the computing device 115 may be pressed before or after writing a snippet to associate the snippet with the selected tag. In other embodiments, the tag may be assigned after the capturing of gestures has been stopped (e.g., after pressing the stop button from the recording controls 720).

In one embodiment, tags are associated with snippets in substantially real-time as snippets are identified. For example, when the user selects a tag 730, the tag is associated with the last identified snippet. In other embodiments, the selection of tag is recorded as an event, but the association between snippets and tags is not necessarily performed immediately or even during the current capture session. For example, in one embodiment, after the gestures capturing has stopped, the captured gestures are analyzed and tags are associated with snippets based on the timestamp the gestures selecting tags were recorded.

In one embodiment, controls may be selected to associate an existing snippet with a new tag. For example, the user may select an existing snippet, either by selecting it on the computing device 115 or the writing surface 105 (e.g., by tapping the writing surface where the snippet is written) and identify a tag to associate with the snippet.

Figure 8A:
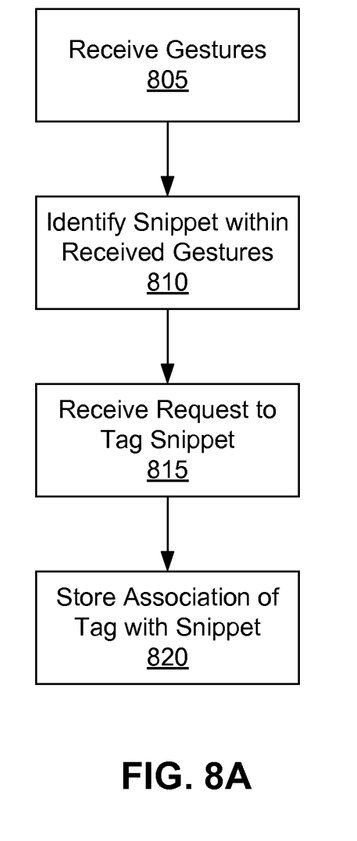
FIG. 8A is a flow diagram of a method for tagging a snippet in an embodiment of a smart pen computing system.

FIG. 8A is a flow diagram illustrating a process for tagging snippets, according to one embodiment. Gestures are received 805. Gestures may include handwriting and selection of control buttons. One or more snippets are identified 810 from the received gestures as described above. In some embodiments, the identification of snippets is done in real time. In other embodiments, identification of snippets is done after recording has stopped. A request to tag a snippet is received 815. The request to tag a snippet may be obtained, for example, by the user interacting with a tagging control 730, by drawing a command (e.g., by drawing a star or a symbol of a tag) next to a snippet, by inputting a command on the computing device 115, or automatically based on content on the snippet. An association of the tag included in the request is stored 820 with the snippet. In some embodiments, the association is stored as metadata in the snippet store 430. In other embodiments, an additional storage module (not shown in the figures) may be used to store associations between tags and snippets.

After tags have been assigned to snippets, a user can retrieve or otherwise manipulate snippets that are associated with a certain tag. For instance, a user may want to know which follow-up actions were assigned during a meeting or over the course of several days or weeks. The user may then select to display the snippets tagged with the follow-up tag 730B. Similarly, the user may select to display all the snippets tagged with the important tag 730A. In some embodiments, the snippets may be displayed as part of a digital document. The user may select controls to change the color of the snippets based on the tags associated with the snippets. For example, the user may select to change the color of snippets associated with the important tag 730A to red, the snippets associated with the follow-up tag 730B to blue, and the like. In other embodiments, other actions may be performed based on the tags associated with snippets 770.

Figure 8B:
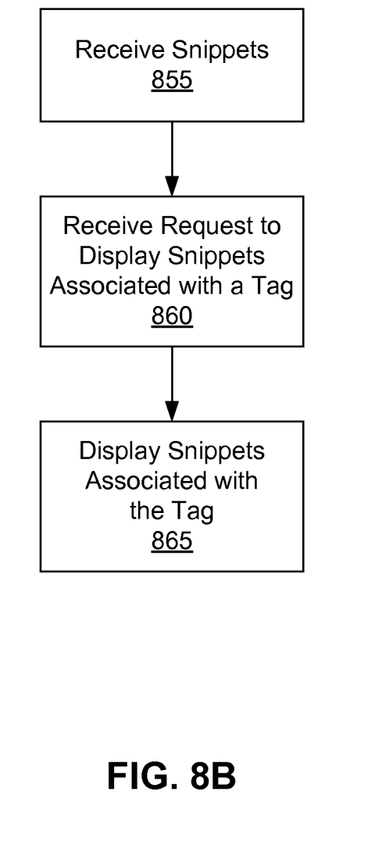
FIG. 8B is a flow diagram of a method for displaying snippets associated with a tag in an embodiment of a smart pen computing system.

FIG. 8B illustrates a flow diagram for retrieving snippets associated with tags. Snippets are received 855 by the computing device 115. A request to display snippets associated with a tag is received 860. The snippets associated with the tag from the request are displayed 865 by the computing system. For example, a request to display snippets associated with the important tag 730A is received 860 and displayed 865 by the computing device 115. After receiving the request to display snippets associated with a tag, the snippets that are not associated with the tag may be faded and/or the snippets associated with the tag may be highlighted.

In other embodiments, tags may be used to organize snippets in other manners. For example, snippets can be sorted based on tag. In another embodiment, actions may be performed on snippets associated with a particular selected tag. For example, the user may select to delete or archive all snippets associated with a user-defined tag. In another example, a user may select a control to automatically copy all tags marked as important into an email.

In the case of user-defined tags, tagged snippets may retain the applied tag even if the attributes of the user-defined button later changes. For example, the user assigns a custom tag to represent "category A" items and then tags snippets with these tags. The user then re-assigns the custom tag to represent "category X" items and tags new snippets with these tags. The snippets originally tagged as "category A" will retain these tags, even though tag associated with the button used to apply the tags has changed. In another embodiment, a batch tag change can be applied to re-assign all snippets associated with a particular tag to a different tag.

Additional Considerations and Embodiments

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program instructions, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for organizing content collected in a pen-based computing system, the method comprising:
   obtaining a plurality of groups of stroke data, the stroke data comprising a representation of one or more strokes made by a smart pen with respect to a writing surface, each group of stroke data having an associated timestamp based on timing of the strokes made by the smart pen;
   grouping, by a processor, the obtained plurality of groups of stroke data into one or more snippets based on a temporal proximity of the timestamps and spatial proximity of the stroke data associated with the obtained groups of stroke data;
   receiving a request to associate a selected snippet with a tag; and
   storing an association between the selected snippet and the tag responsive to the request.

2. The method of claim 1, wherein receiving the request to associate the selected snippet with a tag comprises detecting a gesture of the smart pen interacting with a tagging control on a writing surface, the gesture having associated a timestamp, the method further comprising:
   determining the selected snippet based on the timestamp of the gesture.

3. The method of claim 2, wherein the tagging control is pre-printed on the writing surface.

4. The method of claim 1, wherein receiving the request to associate the selected snippet with a tag comprises:
   detecting a gesture of the smart pen interacting with a tagging control on a writing surface; and
   receiving a selection of a snippet from the one or more snippets displayed on a display screen.

5. The method of claim 1, wherein receiving the request to associate the selected snippet with a tag comprises receiving a gesture of the smart pen device identifying the selected snippet, the gesture having an associated timestamp, the method further comprising:
   determining the selected snippet based on the timestamp of the gesture.

6. The method of claim 5, wherein the gesture of the smart pen identifying the selected snippet further identifies the tag.

7. The method of claim 6, wherein the gesture identifying the selected snippet comprises a drawing of a symbol.

8. The method of claim 1, wherein the tag comprises one of: an important tag, a follow-up tag, and a custom tag.

9. The method of claim 1, wherein the request to associate the selected snippet to a tag comprises selecting a tag on a computing device.

10. A non-transitory computer-readable medium configured to store instructions, the instructions when executed by a processor cause the processor to:
    obtain a plurality of groups of stroke data, the stroke data comprising a representation of one or more strokes made by a smart pen with respect to a writing surface, each group of stroke data having an associated timestamp based on timing of the strokes made by the smart pen;
    group the obtained plurality of groups of stroke data into one or more snippets based on a temporal proximity of the timestamps and spatial proximity of the stroke data associated with the obtained groups of stroke data;
    receive a request to associate a selected snippet with a tag; and
    store an association between the selected snippet and the tag responsive to the request.

11. The computer-readable medium of claim 10, wherein the instructions for receiving the request to associate the selected snippet with a tag cause the processor to:
    detect a gesture of the smart pen interacting with a tagging control on a writing surface; and
    receive a selection of a snippet from the one or more snippets displayed on a display screen.

12. The computer-readable medium of claim 10, wherein the instructions for receiving the request to associate the selected snippet with a tag cause the processor to receive a gesture of the smart pen device identifying the selected snippet, the gesture having an associated timestamp, and wherein the computer-readable medium further comprises instructions that cause the processor to:
  determine the selected snippet based on the timestamp of the gesture.

13. The computer-readable medium of claim 12, wherein the gesture of the smart pen identifying the selected snippet further identifies the tag.

14. The computer-readable medium of claim 13, wherein the gesture identifying the selected snippet comprises a drawing of a symbol.

15. The computer-readable medium of claim 10, wherein the tag comprises one of: an important tag, a follow-up tag, and a custom tag.

16. The computer-readable medium of claim 10, wherein the request to associate the selected snippet to a tag comprises selecting a tag on a computing device.

\* \* \* \* \*